US009973884B2

United States Patent
Daniel et al.

(10) Patent No.: US 9,973,884 B2
(45) Date of Patent: May 15, 2018

(54) DEVICE, SYSTEM AND METHOD OF CONTROLLING ACCESS TO LOCATION SOURCES

(75) Inventors: Tomer Daniel, Herzlyia (IL); Yaron Alpert, Hod Hasharon (IL); Ehud Reshef, Kiryat Tivon (IL)

(73) Assignee: INTEL CORPORATION, Santa Clara, CA (US)

( * ) Notice: Subject to any disclaimer, the term of this patent is extended or adjusted under 35 U.S.C. 154(b) by 1204 days.

(21) Appl. No.: 13/533,006

(22) Filed: Jun. 26, 2012

(65) Prior Publication Data

US 2013/0238857 A1 Sep. 12, 2013

Related U.S. Application Data

(60) Provisional application No. 61/607,776, filed on Mar. 7, 2012.

(51) Int. Cl.
*G06F 12/00* (2006.01)
*G06F 13/00* (2006.01)
(Continued)

(52) U.S. Cl.
CPC ............ *H04W 4/02* (2013.01); *G01S 5/02* (2013.01); *G06F 12/0844* (2013.01);
(Continued)

(58) Field of Classification Search
CPC ............ G06F 17/30; G06F 17/30132; G06F 12/0868; G06F 12/0844; H04W 4/02;
(Continued)

(56) References Cited

U.S. PATENT DOCUMENTS 5,617,100 A   4/1997   Akiyoshi et al.
6,154,656 A   11/2000  Camp, Jr.
(Continued)

FOREIGN PATENT DOCUMENTS

CN    1854755    11/2006
CN    1922505    2/2007
(Continued)

OTHER PUBLICATIONS

International Search Report and Written Opinion Received for PCT Patent Application No. PCT/US2012/031318, dated Nov. 28, 2012, 9 pages.
(Continued)

*Primary Examiner* — Daniel C Chappell
*Assistant Examiner* — Shane Woolwine
(74) *Attorney, Agent, or Firm* — Shichrur & Co.

(57) ABSTRACT

Some demonstrative embodiments include devices, systems and/or methods of controlling access to location sources. For example, a device may include a location caching controller to store cached location information in a cache based on location information retrieved from two or more location sources, to receive at least one location request from at least one application, to select between retrieving requested location information from at least one of the location sources and retrieving the requested location information from the cache, and to provide to the application a location response including the requested location information.

26 Claims, 4 Drawing Sheets

(51) Int. Cl.
*G06F 13/28* (2006.01)
*H04W 4/02* (2018.01)
*G06F 12/0868* (2016.01)
*G06F 12/0844* (2016.01)
*H04W 4/00* (2018.01)
*H04M 1/725* (2006.01)
*H04W 64/00* (2009.01)
*H04L 29/08* (2006.01)
*G01S 5/02* (2010.01)

(52) U.S. Cl.
CPC .......... *G06F 12/0868* (2013.01); *H04L 67/18* (2013.01); *H04M 1/72572* (2013.01); *H04W 4/008* (2013.01); *H04W 64/00* (2013.01)

(58) Field of Classification Search
CPC .......... H04W 4/008; H04W 64/00; G01S 5/02; H04L 67/18; H04M 1/72572
USPC .................................................. 711/113, 118
See application file for complete search history.

(56) References Cited

U.S. PATENT DOCUMENTS

| | | | |
|---|---|---|---|
| 2003/0101225 | A1 | 5/2003 | Han et al. |
| 2003/0128163 | A1 | 7/2003 | Mizugaki et al. |
| 2004/0172418 | A1 | 9/2004 | Dorum et al. |
| 2006/0230137 | A1 | 10/2006 | Gare et al. |
| 2008/0082225 | A1 | 4/2008 | Barrett |
| 2008/0244184 | A1 | 10/2008 | Lewis et al. |
| 2008/0249713 | A1 | 10/2008 | Sessions |
| 2009/0189811 | A1* | 7/2009 | Tysowski et al. ....... 342/357.15 |
| 2009/0192709 | A1 | 7/2009 | Yonker et al. |
| 2009/0287415 | A1 | 11/2009 | Buerger et al. |
| 2010/0291950 | A1 | 11/2010 | Lin et al. |
| 2010/0295726 | A1 | 11/2010 | Tann |
| 2010/0324819 | A1 | 12/2010 | Nurminen et al. |
| 2011/0077862 | A1* | 3/2011 | Huang et al. ................. 701/208 |
| 2011/0117924 | A1 | 5/2011 | Brunner et al. |
| 2012/0136849 | A1* | 5/2012 | Niranjan et al. ............. 707/708 |
| 2012/0315928 | A1 | 12/2012 | Hashimoto et al. |
| 2013/0030700 | A1 | 1/2013 | Miller et al. |
| 2013/0261964 | A1 | 10/2013 | Goldman et al. |
| 2013/0337834 | A1 | 12/2013 | Alpert et al. |
| 2014/0003542 | A1 | 1/2014 | Zukerman et al. |

FOREIGN PATENT DOCUMENTS

| | | |
|---|---|---|
| CN | 101911147 | 12/2010 |
| CN | 102100058 | 6/2011 |
| EP | 1 548 456 | 6/2005 |
| EP | 2365715 | 9/2011 |
| JP | 2003207556 | 7/2003 |
| JP | 2006503345 | 1/2006 |
| JP | 2010151725 | 7/2010 |
| JP | 2010223684 | 10/2010 |
| JP | 2010232944 | 10/2010 |
| JP | 2011149860 | 8/2011 |
| KR | 10-2006-0092894 A | 8/2006 |
| WO | 2002/076118 A1 | 9/2002 |
| WO | 2009078080 | 6/2009 |
| WO | 2009149417 | 12/2009 |
| WO | 2010073113 | 7/2010 |

OTHER PUBLICATIONS

International Search Report and Written Opinion for PCT Application No. PCT/US2013/029350, dated Jun. 2, 2014, 14 pages.
OMA Secure User Plane Location Archive, Candidate Version 2.0—May 27, 2011; Open Mobile Alliance OMA-AD-SUPL-V2_0-20110527-C; 54 pages.
Andrei Popescu, Google, Inc. Geolocation API Specfication, W3C Candidate Recommendation Sep. 7, 2010. W3C Geolocation Working Group; 14 pages.
International Search Report and Written Opinion for PCT Application No. PCT/US2012/032844, dated Aug. 23, 2014, 12 pages.
Office Action for U.S. Appl. No. 13/976,469, dated Sep. 26, 2014, 14 pages.
International Preliminary Report on Patentability for PCT Application No. PCT/US2012/031318, dated Oct. 9, 2014, 6 pages.
International Preliminary Report on Patentability for PCT Application No. PCT/US2012/032844, dated Oct. 23, 2014, 9 pages.
International Preliminary Report on Patentability for PCT Application No. PCT/US2013/029350, dated Sep. 18, 2014, 10 pages.
Office Action for Korean Patent Application Serial No. 20147027175, dated Jan. 29, 2016, 8 pages, including 4 pages of English translation.
Office Action for Japanese Patent Application Serial No. 2014-561074, dated May 17, 2016, 5 pages (Including 2 pages of English translation).
European Search Report for European Patent Application Serial No. 13757185.7, dated Oct. 16, 2015, 8 pages.
Office Action for Japanese Patent Application No. 2014-561074, dated Aug. 25, 2015, 5 pages (including 2 pages of English translation).
Office Action for Korean Patent Application No. 2014-7025147, dated Sep. 9, 2015, 8 pages (including 4 pages of English translation).
European Search Report for European Patent Application Serial No. 12873393.8, dated Oct. 29, 2015, 6 pages.
Notice of Allowance for U.S. Appl. No. 13/976,471, dated Dec. 19, 2016, 19 pages.
Office Action for Chinese Patent Application No. 201380017768.3, dated Jun. 2, 2017, 25 pages (Including 16 pages of English translation).
Office Action for Chinese Patent Application No. 201280072023.2, dated Jun. 1, 2017, 22 pages.(Including 13 pages of English translation).
Office Action for U.S. Appl. No. 13/976,471, dated Jun. 10, 2016, 50 pages.
Office Action for U.S. Appl. No. 13/976,471, dated Sep. 29, 2016, 31 pages.
Office Action for Chinese Patent Application No. 201280072023.2 dated Nov. 10, 2017, 18 pages (Including 10 pages of English translation).
European Search Report for European Patent Application No. 13757185.7, dated Nov. 2, 2017, 8 pages.
Office Action for European Patent Application No. 12873393.8, dated Jan. 4, 2018, 7 pages.
Office Action for Chinese Patent Application No. 201380017768.3, dated Jan. 16, 2018, 10 pages (Including 6 pages of English translation).

* cited by examiner

DEVICE, SYSTEM AND METHOD OF CONTROLLING ACCESS TO LOCATION SOURCES

CROSS REFERENCE

This application claims the benefit of and priority from U.S. Provisional Patent application No. 61/607,776, entitled "Device, System and Method of Adaptive Location Caching", filed Mar. 7, 2012, the entire disclosure of which is incorporated herein by reference.

BACKGROUND

Continuous location awareness is a highly desirable feature in modern computing devices. This capability is required, for example, to support location-based applications, Contextual Aware Computing and/or a multitude of LES (Location Enabled Services) applications, where each and every one of these applications and services require location updates (either periodic or sporadic/one time).

An application executed by a device may use location data received from one or more location data sources to determine an estimated location of the device. For example, a road navigation application may use location data, which may be received, for example, from satellites of a Global Navigation Satellite System (GNSS), cellular based positioning services, WiFi based positioning services, and the like.

The energy consumption of the device may be affected, for example, by the number of accesses to the location source for position updates.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
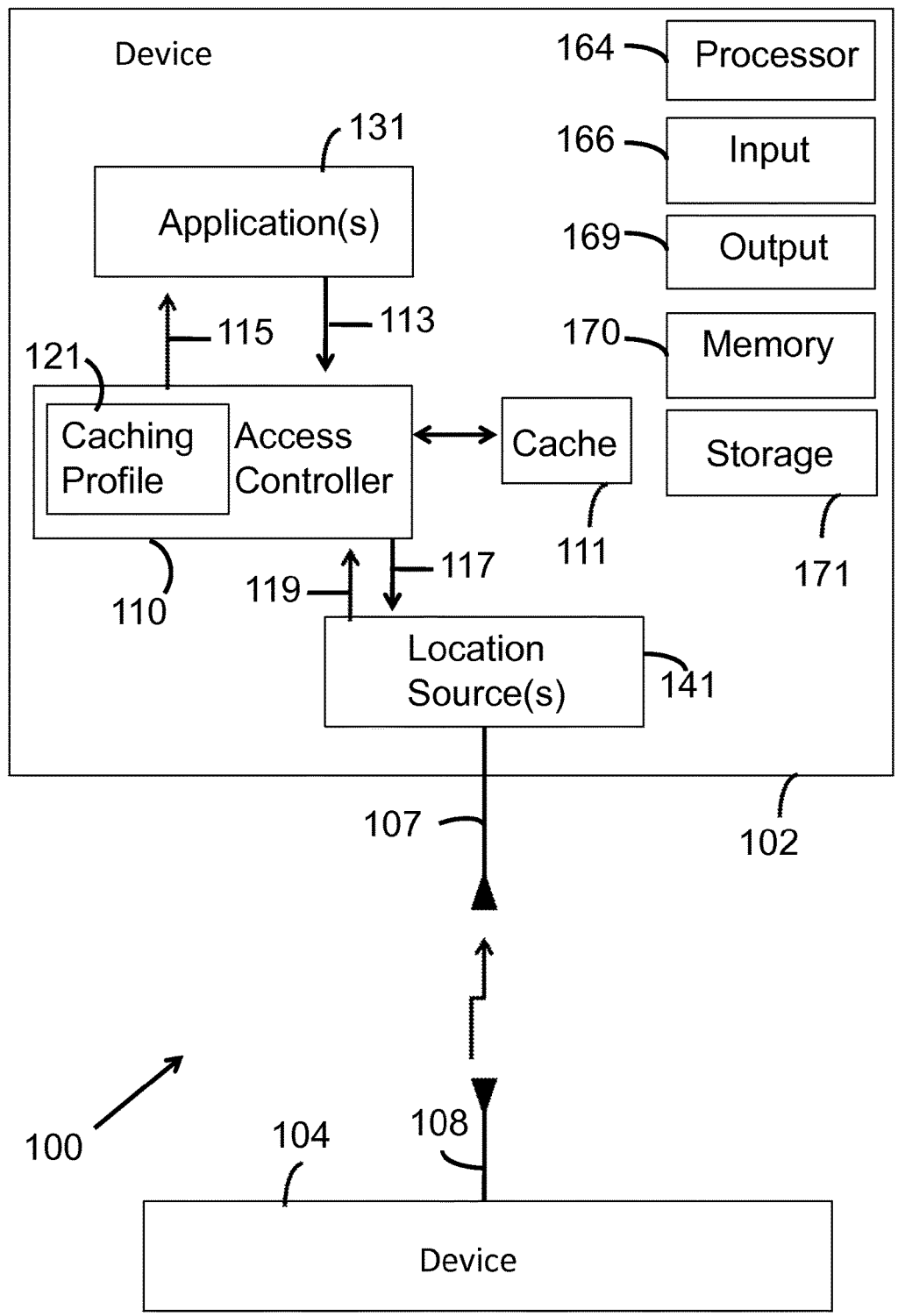
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Wireless Metropolitan Area Network (WMAN) communication system, a Personal Area Network (PAN), a Wireless PAN (WPAN), devices and/or networks operating in accordance with existing IEEE 802.11 standards ("the 802.11 standards"), e.g., including IEEE 802.11 (*IEEE 802.11-2007:Standard for Information technology—Telecommunications and information exchange between systems—Local and metropolitan area networks—Specific requirements, Part 11: Wireless LAN Medium Access Control (MAC) and Physical Layer (PHY) Specifications*—June 2007), 802.11n ("*IEEE 802.11n-2009—Amendment 5: Enhancements for Higher Throughput. IEEE-SA.* 29 Oct. 2009"), 802.11ac ("Very High Throughput <6 Ghz"), 802.11 task group ad (TGad) ("Very High Throughput 60 GHz"), and/or future versions and/or derivatives thereof, devices, and/or networks operating in accordance with IEEE 802.16 standards ("the 802.16 standards"), e.g., including 802.16 (IEEE-Std 802.16, 2004 *Edition, Air Interface for Fixed Broadband Wireless Access Systems*), 802.16d, 802.16e (*IEEE-Std 802.16e, 2005 Edition, Physical and Medium Access Control Layers for Combined Fixed and Mobile Operation in Licensed Bands*), 802.16f, 802.16m standards and/or future versions and/or derivatives thereof, devices, and/or networks operating in accordance with existing Wireless-Gigabit-Alliance (WGA) and/or WirelessHD™ specifications and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, devices and/or networks operating in accordance with existing Open Mobile Alliance (OMA) standards, including the Secure User Plane Location (SUPL) protocol (SUPL-OMA-AD-SUPL-V2.0 5.3.1.8) and/or future versions and/or derivatives thereof, devices and/or networks operating in accordance with existing World-Wide-Web Consortium (W3C) standards, including the *W3C Hypertext Markup Language (HTML)* Version 5, October 2010 and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Global Navigation Satellite System (GNSS) device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, Bluetooth (BT) device, a Near Field Communication (NFC) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Global Navigation Satellite System (GNSS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), Bluetooth (BT), Near Field Communication (NFC), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may be used to provide a wireless service.

Reference is now made to FIG. 1, which schematically illustrates a block diagram of a wireless communication system 100, in accordance with some demonstrative embodiments.

In some demonstrative embodiments, system 100 may include a wireless communication device 102 capable of receiving wireless communication signals including location information 113 related to a location of device 102. Device 102 may receive location information 113 over a wireless communication medium, e.g., via one or more antennas 107.

In some demonstrative embodiments, the wireless medium may include for example, a Radio Frequency (RF) channel, a WiFi channel, a Bluetooth channel, a cellular channel, a GNSS Channel, a NFC channel, and the like.

In some demonstrative embodiments, system 100 may include at least one device 104 configured to transmit the wireless communication signals including location information 113 via one or more antennas 108.

For example, device 104 may include one or more of a location data origin transmitter, e.g., satellites of the GNSS, one or more Wireless Fidelity (WiFi) hotspots or AP's, one or more Bluetooth devices, one or more cellular devices, one or more NFC devices, and the like.

In some demonstrative embodiments, antennas 108 and/or 107 may include any type of antennas suitable for transmitting and/or receiving wireless communication signals, blocks, frames, transmission streams, packets, messages and/or data. Types of antennas that may be used for antennas 108 and/or 107 may include but are not limited to internal antenna, dipole antenna, omni-directional antenna, a monopole antenna, an end fed antenna, a circularly polarized antenna, a micro-strip antenna, a diversity antenna, a phase array antenna and the like. In some embodiments, antennas 108 and/or 107 may implement transmit and receive functionalities using separate transmit and receive antenna elements. In some embodiments, antennas 108 and/or 107 may implement transmit and receive functionalities using common and/or integrated transmit/receive elements.

In some demonstrative embodiments, location information 113 may be related, for example, to a location of device 104, and/or to a relative location between device 102 and device 104.

In some demonstrative embodiments, device 102 may receive location information 113 and may determine a location of device 102 based on location information 113.

In some demonstrative embodiments, device 102 may include one or more location information generators (also referred to as "location sources" or "location origins") 141, configured to provide location information 119 indicating an estimated location of device 102 based on location information 113. For example, location information generators 141 may estimate the location of device 102 based on the location of device 104, for example, by calculating a relative location between device 102 and device 104.

In some demonstrative embodiments, one or more of location sources 141 may include, or may be implemented as part of, at least one wireless communication unit 106 including, for example, one or more wireless transmitters, receivers and/or transceivers able to send and/or receive wireless communication signals, RF signals, frames, blocks, transmission streams, packets, messages, data items, and/or data. For example, one or more of location sources 141 may include, or may be implemented as part of a wireless Network Interface Card (NIC), and the like.

In some demonstrative embodiments, location information generators 141 may include one or more of a GNSS receiver configured to estimate the location of device 102 based on location information received from at least one GNSS device, e.g., satellites; a WiFi location information generator configured to estimate the location of device 102 based on location information received from at least one WiFi device, e.g., a WiFi hot spot or AP; a Bluetooth location information generator configured to estimate the location of device 102 based on location information received from at least one BT device; a NFC location information generator configured to estimate the location of device 102 based on location information received from at least one NFC device; a cellular location information generator configured to estimate the location of device 102 based on location information received from at least one cellular device, e.g., a cellular antenna and/or cellular operator, and the like, In some demonstrative embodiments, device 102 may include one or more applications 131 executed by device 102.

In some demonstrative embodiments, device 102 may include, or may be included as part of a mobile or portable device, for example, a mobile computer, a laptop computer, a notebook computer, a tablet computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, device 102 may include, for example, one or more of a processor 164, an input unit 166, an output unit 169, a memory unit 170, and a storage unit 171. Device 102 may optionally include other suitable hardware components and/or software components. In some embodiments, some or all of the components of device 102 may be enclosed in a common housing or packaging, and may be interconnected or operably associated using one or more wired or wireless links. In other embodiments, components of device 102 may be distributed among multiple or separate devices or locations.

Processor 164 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 164 executes instructions, for example, of an Operating System (OS) of wireless communication device 102, of one or more of applications 131, and/or of one or more suitable applications.

Input unit 166 includes, for example, a keyboard, a keypad, a mouse, a touch-pad, a track-ball, a stylus, a microphone, or other suitable pointing device or input device. Output unit 169 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 170 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 171 includes, for example, a hard disk drive, a floppy disk drive, a Compact Disk (CD) drive, a CD-ROM drive, a DVD drive, or other suitable removable or non-removable storage units. Memory unit 170 and/or storage unit 171, for example, may store data processed by wireless communication device 102. For example, memory 170 and/or storage unit 171 may store instructions resulting in one or more of applications 131.

In some demonstrative embodiments, applications 131 may use and/or process location information 119. Applications 131 may include, for example, an application of location-based device persona, an application of Contextual Aware Computing, one or more LES (Location Enabled Services) applications, and the like.

In one example, applications 131 may include a road/terrain navigation application, which may use location information 119 in order to navigate a vehicle on a road/terrain.

In another example, applications 131 may include a consumer application, a social application, an entertainment application, a sports application, e.g., a running application, a bicycle tour application, and the like, a location based recommendation application, e.g., a restaurant recommendation application, a touristic location recommendation application, an entertainment recommendation application and the like, a tracking application, e.g., a fleet management application, a delivery management application, a transportation management application, and the like.

In some demonstrative embodiments, applications 131 may generate location requests 113 to request location information 119 from location sources 141.

In some demonstrative embodiments, the location requests generated by applications 131 may not be synchronized, e.g., in terms of timing, intent and/or accuracy.

For example, there may be a lack of time-wise synchronization if, for example, two applications 131 request the same location request with a time shift, e.g., forcing location sources, CPU and/or hardware to separately process both requests and/or to wake up for both requests.

A lack of synchronization due to different intent characteristics may occur, for example, if applications 131 use the location information for different purposes. For example, some of applications 131 may be configured to show a location on a map, while some of applications 131 may just need to know if a user of device 102 is close to other friends, and the like.

A lack of synchronization due to different accuracy characteristics may occur, for example, if applications 131 have different accuracy requirements. For example, some of applications 131, e.g., navigation and/or smart shopping applications, may require a first, relatively high, level of accuracy, while some of applications 131, e.g., social location sharing applications, may require a second, relatively low level of accuracy, e.g., compared to the first level of accuracy. For example, navigation and/or smart shopping applications may require a very accurate location, e.g., an accuracy of several meters, while the social location sharing applications may only require a city name or city neighborhood to sign a status location.

In some demonstrative embodiments, the more a location source 141 is accessed for retrieving location information ("position update"), the more energy used by device 102. Accordingly, it may be desired to reduce the number and/or control a pattern of accesses to location sources 141.

In some demonstrative embodiments, device 102 may include an access controller 110 to interface between one or more applications 131 and one or more location sources 141, e.g., as described in detail below.

In some demonstrative embodiments, access controller 110 may controllably access location sources 141, based on location requests 113 from applications 131, e.g., as described below.

In some demonstrative embodiments, access controller 110 may perform the functionality of a location caching controller configured to controllably access location sources 141 by selecting between retrieving requested location information, which is requested according to requests 113, from at least one of location sources 141 and retrieving the requested location information from cached location information, which is based on location information previously retrieved from at least one of location sources 141, e.g., as described in detail below.

Additionally or alternatively, in some demonstrative embodiments, access controller 110 may be configured to controllably access location sources 141 by coalescing two or more requests 113, e.g., including from two or more of applications 131 to retrieve location information from a particular location source of location sources 141, into a coalesced location request to retrieve location information from the particular location source, and providing to the two or more two or more location responses based on the retrieved location information from the location source, e.g., as described below.

In some demonstrative embodiments, controller 110 may store cached location information, which is based on location information retrieved from two or more of location sources 141, to receive at least one location request from at least one application of applications 131, to select between retrieving requested location information from at least one of the two or more location sources 141 and retrieving the requested location information from the cached location information, and to provide to the application 131 a location response including the requested location information, e.g., as described in detail below.

In some demonstrative embodiments, device 102 may include a cache memory 111 to store cached location information corresponding to and/or based on location information retrieved from location sources 141.

In some demonstrative embodiments, cache memory 111 may be implemented as part of memory 170, as part of controller 110 and/or as any other memory and/or storage element and/or unit.

In some demonstrative embodiments, controller 110 may retrieve location information from location sources 141, e.g., based on requests 113, and may store in memory 111 the cached location information based on the location information retrieved from location sources 141.

In some demonstrative embodiments, controller 110 may dynamically update a location caching profile 121 based on location requests 113, e.g., as described below.

In some demonstrative embodiments, controller 110 may select between retrieving the requested location information from at least one of location sources 141 and retrieving the requested location information from the cached location information of cache 111, based on location caching profile 121, e.g., as described in detail below.

In some demonstrative embodiments, controller 110 may receive a location request 113 from an application of applications 131 and, in response to the location request controller 110 may select, based on the location caching profile, whether to retrieve requested location information from location sources 141 or from the cached location information of cache 111, and to provide to the application a location response 115 including the requested location information.

In some demonstrative embodiments, controller 110 may control adaptive location caching of the location information from location sources 141.

In some demonstrative embodiments, controller 110 may be responsible for accepting location requests 113 and generating profile 121, e.g., including a unified dynamic profile, from multiple application requests 113.

In some demonstrative embodiments, controller 110 may derive location information 119 from one or more location sources 141 according to profile 121.

In some demonstrative embodiments, controller 110 may utilize a dedicated location intent interface, an undedicated interface, an application programming interface (API), or any other interface to communicate with applications 131 and location sources 141. In some embodiments, controller 110 may be implemented as part of an operating system of device 102.

In some demonstrative embodiments, controller 110 may use a dedicated power optimized location source interface, for example, to optimize a power consumption of device 102, e.g., to optimize a total power consumption of device 102 and/or a total power consumption of location sources 141.

In some demonstrative embodiments, controller 110 may use one or more adaptive location caching strategies to select the location information to be cached in cache 111 and/or to select between retrieving the requested location information from cache 111 or from location sources 141.

In some demonstrative embodiments, controller 110 may define the adaptive location caching strategies based, for example, on criteria related to applications 131 and/or sources 141, e.g., criteria related to a required accuracy, availability and/or relevancy of the location information; and/or criteria related to a power consumption of device 102, e.g., criteria to optimize the total power consumption of device 102 and/or the total power consumption of location sources 141.

In some demonstrative embodiments, a location caching strategy may include one or more strategy layers corresponding to one or more caching criteria to be used to select the location information to be cached in cache 111 and/or to select between retrieving the requested location information from cache 111 or from location sources 141. For example, the location caching strategy may include a movement filtering layer, a relevancy layer, a coalescing layer, and/or any other layer, e.g., as described below.

In some demonstrative embodiments, controller 110 may run through the strategy layers, e.g., according to a predefined order. For example, the Controller 110 may select to retrieve the requested location information from cache 111, for example, upon complying with a layer of the location caching strategy. Controller 110 may select to access location sources 141 to retrieve the requested location information, for example, after exhausting one or more of the strategy layers, e.g., only after all layers are exhausted.

In some demonstrative embodiments, the movement filtering layer may filter a location request 113 based on at least one movement criterion relating to movement of device 102.

For example, the movement filtering layer may utilize input from one or more movement sensors and/or from one or more of location sources 141 to decide whether or not there is "significant movement" of device 102. The movement sensors may include, for example, a software detector to detect movement of device 102, e.g., based on information relating to a location and/or orientation of device 102, a hardware detector, e.g., a gyroscopic movement detector, and/or any other movement detector. In another example, controller 110 may receive an indication of movement of device 102 from one or more of applications 131 and/or one or more of location sources 141.

In some demonstrative embodiments, controller 110 may select whether to retrieve the requested location information from at least one of location sources 141 or from the cached location information of cache 111, for example, based on the movement criterion.

For example, controller 110 may select to retrieve the requested location information from the cached location information of cache 111, e.g., without accessing location sources 141, for example, if the sensed movement of device 102 is less than or equal to a predefined movement threshold.

In some demonstrative embodiments, controller 110 may select to check a next strategy layer, e.g., the relevancy layer, for example, if the movement criterion is not fulfilled, e.g., if the sensed movement of device 102 is greater than the movement threshold.

In some demonstrative embodiments, the relevancy layer categorize the location request 131 from a particular application 131 based on at least one relevancy criterion defining a relevancy of the cached location information to the particular application 131.

The relevancy criterion may relate, for example, to one or more of an intent parameter defining an intended use of the requested location information by the particular application 131, a time parameter relating to a timing of the location request 131, an accuracy parameter defining a required accuracy of the requested location information, a key-performance-indicator (KPI), and/or any other relevancy parameter.

For example, a first application 131 may have a first intended use for the requested location information, e.g., vehicle navigation, which may require relatively recent and up-to-date location information, e.g., compared to a second application 131, which may have a second intended use for the requested location information, e.g., a social application, which may require less-frequent updating of the location information.

In some demonstrative embodiments, controller 110 may select whether to retrieve the requested location information from at least one of location sources 141 or from the cached location information of cache 111, for example, based on the relevancy criterion.

In one example, applications 131 may be characterized according to a type of service provided by applications 131 and/or location sources 141 may be characterized according to a location estimation technology utilized by location sources 141.

For example, an accuracy criterion corresponding to applications 131 may be predefined, e.g., as follows:

TABLE 1

| Service | Required Accuracy |
|---|---|
| Outdoors & Indoor smart navigation | 1-5 m |
| Always located | 5-10 m |
| Location based scheduling | 5-10 m |

TABLE 1-continued

| Service | Required Accuracy |
|---|---|
| Location scoreboarding & logging | 5-10 m |
| Location & activity based profiling | 5-10 m |
| Smart shopping† | 1-5 m |
| Location sharing | 3-5 m |
| Anti Theft | 5-10 m |
| Assets & people tracking | 3-20 m |
| Location aware computing | 3-10 m |
| Location enabled ERM | 3-10 m |
| Location authentication | 3-10 m |

For example, an accuracy criterion corresponding to location sources 141 may be predefined, e.g., as follows:

TABLE 2

| Technology | Required Accuracy |
|---|---|
| GNSS | 4-10 m |
| WIFI | 20-25 m |
| Cellular | 50-250 m |

For example, controller 110 may select to retrieve the requested location information from the cached location information of cache 111 and/or to estimate the location estimation based on the cached location information, e.g., without accessing location sources 141, for example, if a last known location of device 102 is deemed relevant with respect to the particular application 131, e.g., in accordance with the accuracy requirements of Tables 1 and/or 2.

In some demonstrative embodiments, controller 110 may selectively update the adaptive location caching profile 121, e.g., based on location requests 113, to calculate a new unified dynamic profile 121, and/or to, optionally, update one or more parameters of location sources 141.

In some demonstrative embodiments, controller 110 may negotiate one or more layers of caching profile 121 with at least one application of applications 131.

In some demonstrative embodiments, controller 110 may receive from the application 131 a request 113 and/or one or more requested application-specific profile parameters corresponding to caching profile 121, e.g., in the form of one or more KPIs. For example, controller 110 may receive from the application 131 a movement threshold parameter defining a requested application-specific movement threshold to be applied by the movement filtering layer of profile 121. Additionally or alternatively, controller 110 may receive from the application 131 one or more relevancy parameters to be applied by the relevancy layer of profile 121.

In some demonstrative embodiments, controller 110 may select whether or not to apply the requested application-specific profile parameters to profile 121. Controller 110 may select, for example, not to utilize any of the requested application-specific profile parameters, to utilize some of the requested application-specific profile parameters, or to utilize all of the requested application-specific profile parameters. Accordingly, controller 110 may define updated profile parameters of profile 121.

In some demonstrative embodiments, controller 110 may communicate back to the application 131, profile information including information regarding the updated profile 121 and/or one or more KPIs of profile 121. For example, controller 110 may communicate back to the application 131 one or more of the updated profile parameters of profile 121, and/or an indication relating to the requested application-specific profile parameters, e.g., an indication that all of the requested application-specific profile parameters are accepted by controller 110, or an indication that all of the requested application-specific profile parameters are rejected by controller 110.

In some demonstrative embodiments, the application 131 may receive the profile information and may decide to confirm the updated profile 121 and/or to send another request to controller 131 to negotiate one or more parameters of profile 121.

In some demonstrative embodiments, controller 110 may update one or more information-retrieval parameters of one or more of location sources 141 based on location caching profile 121. The Information retrieval parameters of a location source may include one or more parameters relating to an operation of the location source, e.g., a power mode of the location source, a wakeup schedule of the location source, and the like; one or more parameters relating to location data to be provided by the location source, e.g., an accuracy of the data, a rate at which the location data is to be provided, a timing at which the location data is to be provided, and the like; one or more parameters relating to a configuration of the location source, and the like.

For example, controller 110 may be capable of controlling a particular location source 141 to adjust one or more parameters of the particular location source 141 based on profile 121.

In one example, controller 110 may control a configuration of an operational mode of the particular location source 141 based on profile 121.

For example, profile 121 may include a relevancy criterion defining that all of applications 131 require location information at a relatively low level of accuracy and/or at a relatively low update rate. Accordingly, controller 110 may control location sources 141 to switch to a reduced power mode for a relatively long time period and/or to define a wakeup schedule of location sources 141 according to the low update rate. In some demonstrative embodiments, controller 110 may update one or more parameters of profile 121, for example, a power parameter defining a criterion relating to the power consumption of device 102, an accuracy parameter, an availability, e.g., coverage, parameter, a responsiveness (time to fix) parameter, a position parameter, e.g., indoor, outdoor and the like, an activity parameter, e.g., walking, driving, an the like. For example, controller 110 may update the one or more parameters of profile 121 based on one or more attributes of one or more of location sources 141, e.g., based on an operational mode of location sources 141.

In some demonstrative embodiments, controller 110 may select a particular location source 141 for retrieving the requested location information, e.g., if controller selects to retrieve the requested information from location sources 141.

In some demonstrative embodiments, controller 110 may select the particular location source 141 for retrieving the requested location information based, for example, on the location request 113.

In one example, location request 113 may include an indication of a preferred location source 141 selected by the requesting application 131.

In another example, controller 131 may identify the requesting application 131 and may select the particular location source 141 based on the identity of the requesting application 131. For example, controller 131 may select the particular location source 141 based on at least one parameter relating to the requesting application 131, e.g., a type of the requesting application 131, a type of location information required by the requesting application 131, an accuracy level of the location information required by the requesting application 131, and the like.

In some demonstrative embodiments, controller 110 may select the particular location source 141 for retrieving the requested location information based, for example, on a last known location of device 102. For example, controller 110 may be configured to select a location source having an expected higher greater level of accuracy and/or an expected reduced power consumption level with respect to the last known location.

In one example, controller 110 may select a first location source 141, e.g., a GNSS receiver, at a first location, e.g., an outdoor location, and a second location source 141, e.g., a WiFi receiver, at a second location, e.g., an indoor location.

In another example, controller 110 may select a first location source 141, e.g., a GNSS receiver, at a first activity, e.g., walking, and a second location source 141, e.g., a cellular receiver, at a second activity, e.g., driving.

In some demonstrative embodiments, controller 110 may be configured to coalesce location requests 113 from a plurality of applications 131, e.g., as described below.

In some demonstrative embodiments, controller 110 may implement the coalescing as part of or together with profile 121. For example, profile 121 may include a coalescing layer utilizing a coalescing method to create a location update pattern optimized to support known periodic location requests, as to yield less hardware accesses.

In other demonstrative embodiments, controller 110 may implement the coalescing independent of profile 121, or even if cache 11 and/or profile 121 are not utilized.

In some demonstrative embodiments, controller 110 may receive from a first application 131 a first location request 113 for receiving location information from at least one location source 141, may receive from a second application 131 a second location request 113 for receiving location information from the location source 141, may coalesce the first and second location requests 113 into a coalesced location request 119 to retrieve location information from the location source 141, and may provide to the first and second applications 131 first and second location responses 115 based on the retrieved location information from the location source 141.

In some demonstrative embodiments, the first location request 113 may be for receiving location information at a first periodic interval, and the second location request 113 may be for receiving location information at a second periodic interval, different from and/or shifted with respect to, the first periodic interval. Controller 110 may coalescing the first and second location requests 113 by providing the coalesced location request to the location source 141 at a coalesced periodic interval, which is based on the first and second periodic intervals and/or which coincides with the timing of one of the first and second periodic intervals.

In some demonstrative embodiments, controller 110 may selectively coalesce the requests 113 by identifying and aligning, to a common time frame, similar requests 113, e.g., to similar location sources 141, from different applications 131. For example, several applications 131 may request for a periodic location, e.g., every minute, while the requests may be shifted from one another, e.g., by a few seconds. Controller 110 may coalesce the requests into a single coalesced one-minute periodic request.

In some demonstrative embodiments, controller 110 may also coalesce the requests taking into account location source parameters relating to location sources 141, e.g., power consumption, accuracy, availability, responsiveness, and the like.

Figure 2:
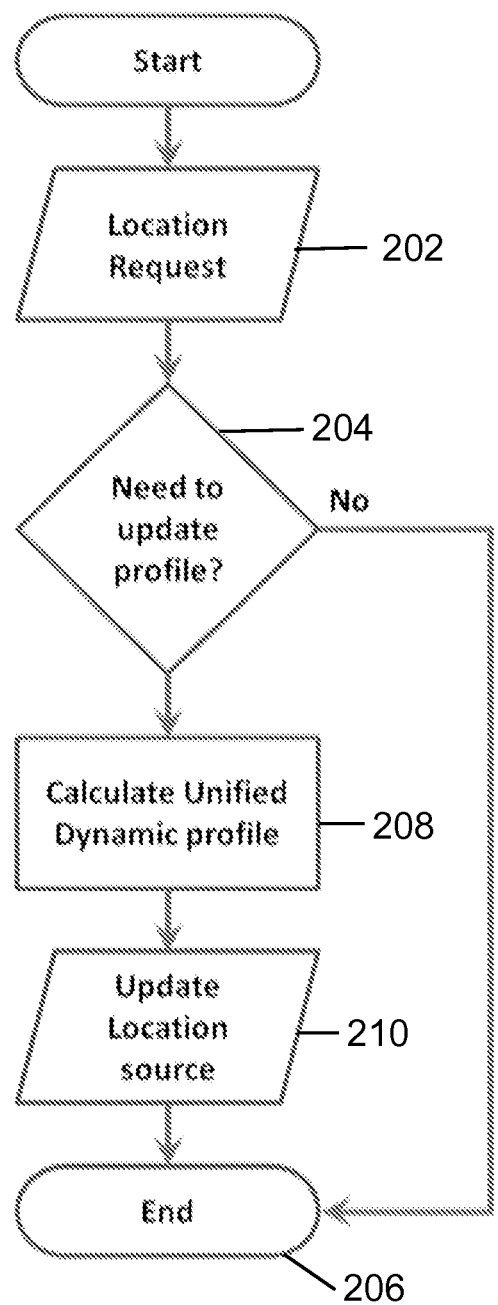
FIG. 2 is a schematic flow chart illustration of a method of dynamically updating a caching profile, in accordance with some demonstrative embodiments.

FIG. 2 is a schematic flow chart illustration of a method of dynamically updating a caching profile, in accordance with some demonstrative embodiments. In some demonstrative embodiments, one or more of the operations of FIG. 2 may be performed by controller 110 (FIG. 1) to update profile 121 (FIG. 1).

As indicated at block 202, the method may include receiving a location request from an application. For example, controller 110 (FIG. 1) may receive location request 113 (FIG. 1) from application 131 (FIG. 1), e.g., as described above.

As indicated at block 204, the method may include determining whether or not the caching profile is to be updated, e.g., based on the received location request. For example, controller 110 (FIG. 1) may determine whether or not caching profile 121 (FIG. 1) is to be updated. For example, controller 110 (FIG. 1) may compare one or more KPIs of the request 113 (FIG. 1) to the caching criteria defined for profile 121 (FIG. 1).

As indicated at block 206, the method may include maintaining the caching profile, e.g., without updating the profile. For example, controller 110 may determine not to update the caching profile, e.g., if the caching profile matches the KPI of the request.

As indicated at block 208, the method may include updating the profile, e.g., if it is determined that the profile is to be updated.

In some demonstrative embodiments, controller 110 (FIG. 1) may selectively update profile 121 (FIG. 1), for example, based on the power criteria, accuracy criteria, availability criteria, responsiveness criteria and/or the one or more location KPIs of request 113.

Additionally or alternatively, controller 110 (FIG. 1) may selectively update profile 121 (FIG. 1), for example, based on one or more indications from location sources 141, for example, location information, e.g., location fix, position-velocity-time (PVT) and the like; KPIs of location sources 141, e.g., power, accuracy, availability, responsiveness and the like; one or more location events, e.g., a position (indoor outdoor), an activity (walking, driving), and the like.

As indicated at block 210, the method may optionally include updating one or more of the location sources according to the updated profile, e.g., to request the location sources to provide the location information according to the updated profile.

Figure 3:
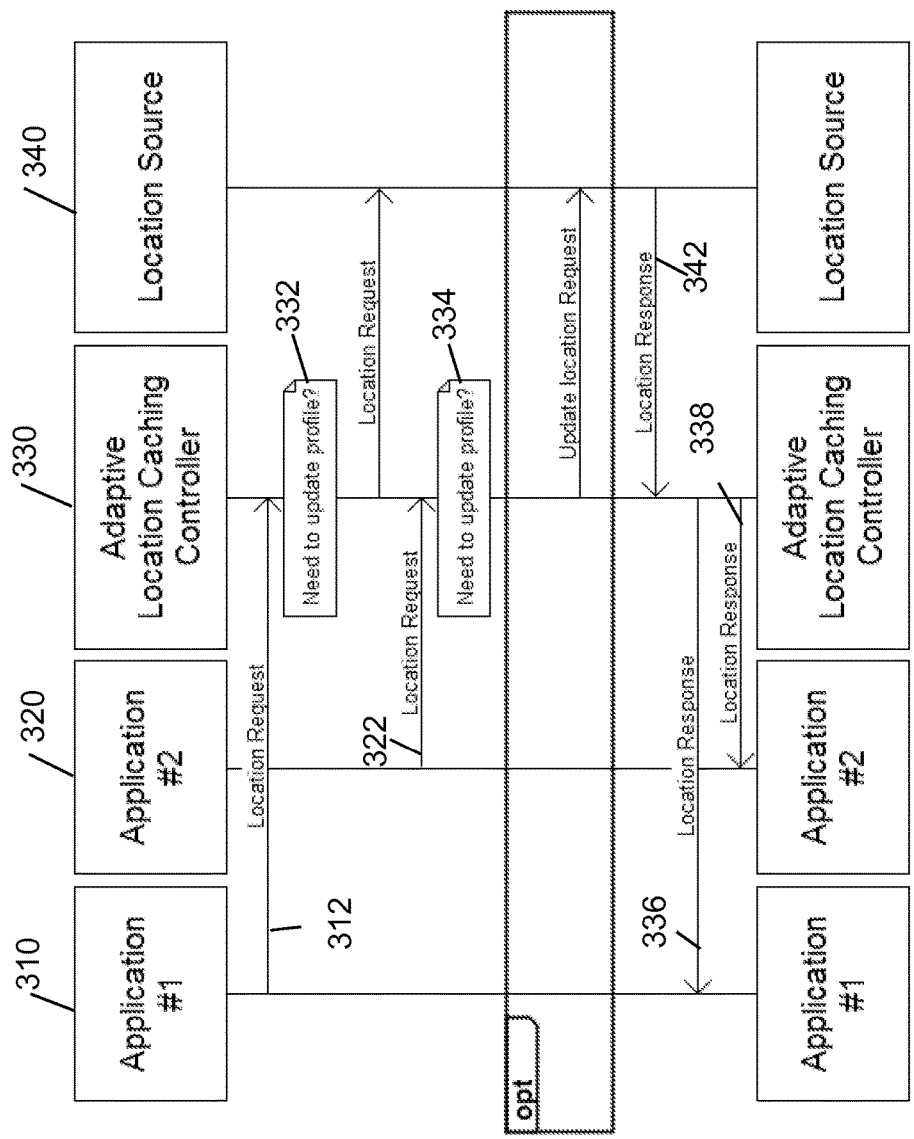
FIG. 3 is a schematic illustration of a sequence of operations performed by first and second applications, a location caching controller and one or more location sources, in accordance with some demonstrative embodiments.

FIG. 3 illustrates a sequence of operations performed by first and second applications, e.g., applications 131 (FIG. 1), a controller, e.g., controller 110 (FIG. 1), and one or more location sources, e.g., location sources 141 (FIG. 1).

As shown in FIG. 3, a first application 310 may issue a location request 312 to a controller 330, which may update a unified dynamic profile 332 and, optionally, update a location source 340. A second application 320 may issue its own location request 322 to the controller 330, which may further update its unified dynamic profile 334 and, optionally, update the location source 340.

As also shown in FIG. 3, controller 330 may receive a location response 342 from location source 340. Controller 330 may send a location response 336 to application 310 and a location response 338 to application 320, e.g., both based on the location response 342.

Figure 4:
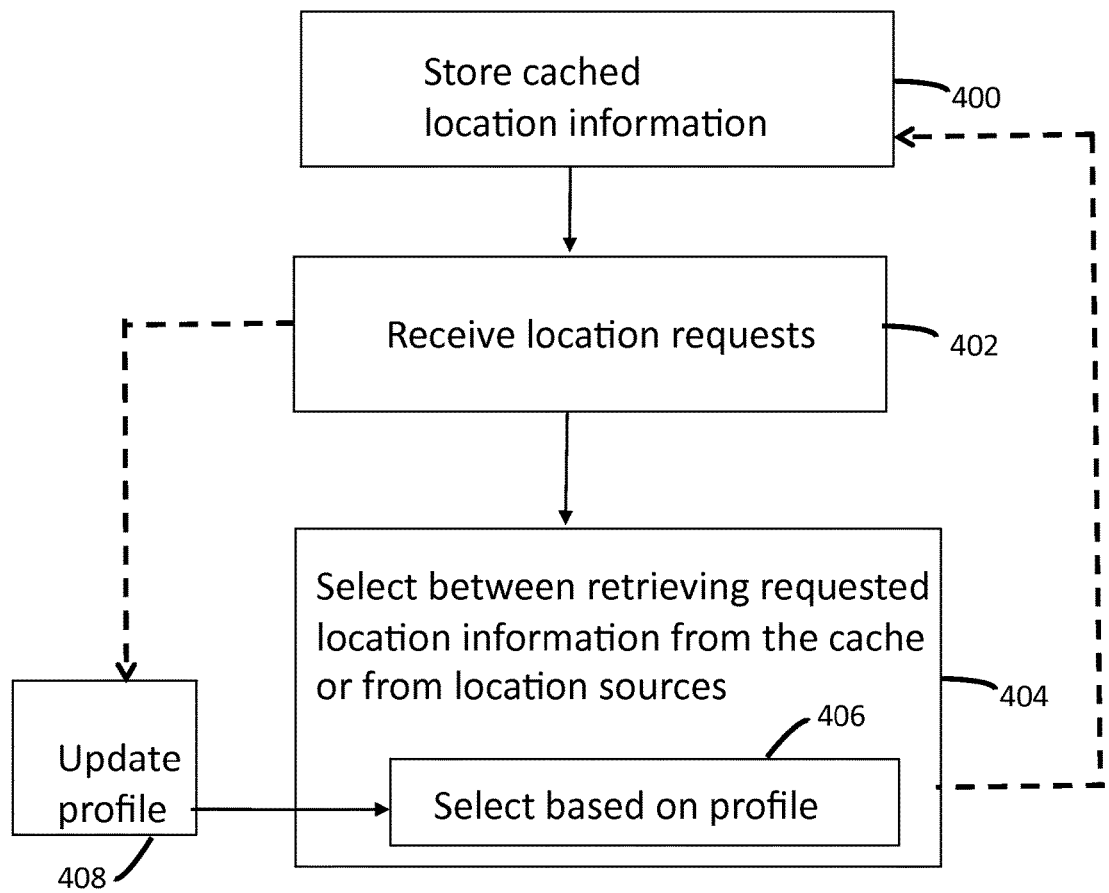
FIG. 4 is a schematic flow chart illustration of a method of controlling access to location sources, in accordance with some demonstrative embodiments.

Reference is made to FIG. 4, which schematically illustrates a method of controlling access to location sources, in accordance with some demonstrative embodiments. In some demonstrative embodiments, one or more operations of the method of FIG. 4 may be performed by one or more elements of system 100 (FIG. 1), e.g., device 102 (FIG. 1), controller 10 (FIG. 1), applications 131 (FIG. 1) and/or location sources 141 (FIG. 1).

As indicated at block 400, the method may include storing cached location information, which is based on location information retrieved from two or more location sources co-located on a device. For example, controller 110 (FIG. 1) may store cached location information in cache 111 (FIG. 1), e.g., as described above.

As indicated at block 402, the method may include receiving one or more location requests from at least one application. For example, controller 110 (FIG. 1) may receive one or more location requests 113 (FIG. 1) from one or more applications 131 (FIG. 1), e.g., as described above.

As indicated at block 404, the method may include selecting between retrieving requested location information from cached location information and retrieving the requested location information from the one or more location sources. For example, controller 110 (FIG. 1) may select between retrieving the requested location information from the cached location information and retrieving the requested location information from the one or more location sources 141 (FIG. 1), e.g., as described above.

As indicated at block 406, selecting between retrieving requested location information from cached location information and retrieving the requested location information from the one or more location sources may include selecting between retrieving requested location information from cached location information and retrieving the requested location information from the one or more location sources, based on a location caching profile. For example, controller 110 (FIG. 1) may select between retrieving the requested location information from the cached location information and retrieving the requested location information from the one or more location sources 141 (FIG. 1), based on profile 121 (FIG. 1), e.g., as described above.

As indicated at block 408, the method may include dynamically updating the location caching profile based on the location requests. For example, controller 110 (FIG. 1) may dynamically update profile 121 (FIG. 1) based on requests 113 (FIG. 1), e.g., as described above.

Figure 5:
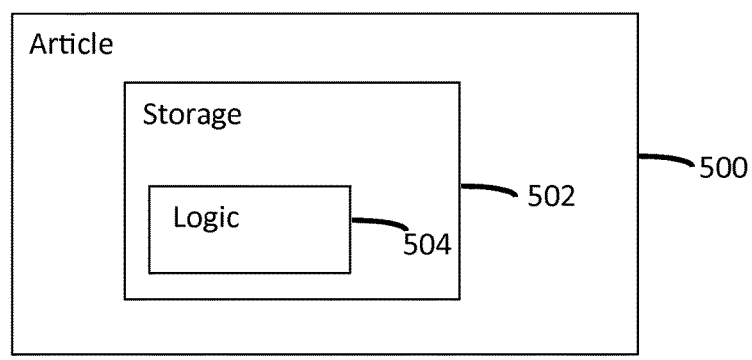
FIG. 5 is a schematic illustration of an article of manufacture, in accordance with some demonstrative embodiments.

Reference is made to FIG. 5, which schematically illustrates an article of manufacture 500, in accordance with some demonstrative embodiments. Article 500 may include a non-transitory machine-readable storage medium 502 to store logic 504, which may be used, for example, to perform at least part of the functionality of controller 110 (FIG. 1), and/or to perform one or more operations of the methods of FIG. 2 and/or 4. The phrase "non-transitory machine-readable medium" is directed to include all computer-readable media, with the sole exception being a transitory propagating signal.

In some demonstrative embodiments, article 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of embodiments have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A device comprising:
two or more location sources; and
a location caching controller to store cached location information in a cache based on location information retrieved from the two or more location sources, the location information indicating an estimated location of the device, the location caching controller is to dynamically update a location caching profile based on a plurality of location requests generated by a plurality of applications, the location caching controller to receive at least one location request from at least one application of the plurality of applications, to select between retrieving requested location information from at least one of said location sources and retrieving the requested location information from said cache based on said location caching profile, and to provide to said application a location response including the requested location information.

2. The device of claim 1, wherein said location caching controller is to negotiate one or more parameters of said caching profile with said at least one application.

3. The device of claim 1, wherein said location caching controller is to update one or more information-retrieval parameters of said one or more location information sources based on said location caching profile.

4. The device of claim 1, wherein said location caching controller is to select whether to retrieve the requested location information from at least one of said location sources or from said cache, based on at least one movement criterion relating to a movement of said device.

5. The device of claim 1, wherein said location caching controller is to select whether to retrieve the requested location information from at least one of said location sources or from said cache, based on at least one relevancy criterion defining a relevancy of said cached location information to said application.

6. The device of claim 5, wherein said relevancy criterion relates to at least one relevancy parameter selected from the group consisting of an intent parameter defining an intended use of the requested location information by said application, a time parameter relating to a timing of the location request, an accuracy parameter defining a required accuracy of the requested location information, and a key-performance-indicator (KPI).

7. The device of claim 1, wherein said location caching controller is to select the at least one location source of said location sources based on the location request.

8. The device of claim 1, wherein said location caching controller is to select the at least one location source of said location sources based on at least one parameter selected from the group consisting of a parameter relating to a location of said device, and a parameter relating to said application.

9. The device of claim 1, being a mobile device including said at least one application.

10. A device comprising:
two or more location sources; and
a location caching controller to store cached location information in a cache based on location information retrieved from the two or more location sources, the location information indicating an estimated location of the device, the location caching controller to receive at least one location request from at least one application, to select between retrieving requested location information from at least one of said location sources and retrieving the requested location information from said cache, and to provide to said application a location response including the requested location information, wherein said location caching controller is to coalesce location requests from at least first and second applications into a coalesced location request from said one or more location sources.

11. The device of claim 10, wherein said location caching controller is to select the at least one location source of said location sources based on the location request.

12. A method performed by a mobile device, the method comprising:
receiving from a first application a first location request for receiving location information from at least one location source of said mobile device;
receiving from a second application a second location request for receiving location information from said location source of said mobile device;

coalescing the first and second location requests into a coalesced location request to retrieve location information from the location source; and providing to said first and second applications first and second location responses based on the retrieved location information from the location source.

13. The method of claim 12, wherein the first location request is for receiving location information at a first periodic interval, wherein the second location request is for receiving location information at a second periodic interval, different from said first periodic interval, and wherein coalescing the first and second location requests comprises providing the coalesced location request to the location source at a coalesced periodic interval, which is based on said first and second periodic intervals.

14. The method of claim 12, comprising:
storing cached location information, which is based on location information retrieved from said at least one location source;
in response to at least one location request from at least one application of said first and second applications, selecting between retrieving requested location information from said location source and retrieving the requested location information from said cached location information; and
providing to said at least one application a location response including the requested location information.

15. The method of claim 14, comprising:
dynamically updating a location caching profile based on a plurality of location requests generated by said first and second applications,
wherein said selecting comprises selecting between retrieving the requested location information from at least one of said location sources and retrieving the requested location information from said cached location information, based on said location caching profile.

16. The method of claim 15, comprising negotiating one or more parameters of said caching profile with said at least one application.

17. The method of claim 15, wherein dynamically updating said location caching profile comprises updating said location caching profile based on at least one criterion selected from the group consisting of a movement criterion, and a relevancy criterion defining a relevancy of said cached location information to said at least one application.

18. A system comprising:
a mobile device including:
a radio;
one or more antennas;
a memory;
one or more location information sources; and
a location caching controller to retrieve location information from said location sources, to store in said memory cached location information corresponding to the location information retrieved from said location sources, and to dynamically update a location caching profile based on a plurality of location requests from a plurality of applications executed by said mobile device,
wherein in response to a location request from an application of said plurality of applications, said location caching controller is to select, based on said location caching profile, between retrieving requested location information from said one or more location sources and retrieving the requested location information from said memory, and to provide to said application a location response including the requested location information.

19. The system of claim 18, wherein said location caching controller is to negotiate one or more parameters of said caching profile with said application.

20. The system of claim 18, wherein said location caching controller is to update one or more information-retrieval parameters of said one or more location information sources based on said location caching profile.

21. The system of claim 18, wherein said location caching profile relates to at least one criterion selected from the group consisting of a movement criterion relating to a movement of said mobile device, and a relevancy criterion defining a relevancy of said cached location information to said application.

22. The system of claim 18, wherein said location caching controller is to coalesce location requests from at least first and second applications of said plurality of applications into a coalesced location request from said one or more location sources.

23. A computer-readable non-transitory storage medium that contains instructions stored thereon that, when executed by a processor of a mobile device, result in:
receiving from a first application a first location request for receiving location information from at least one location source of the mobile device;
receiving from a second application a second location request for receiving location information from said location source of the mobile device; and
coalescing the first and second location requests into a coalesced location request to retrieve location information from the location source; and
providing to said first and second applications first and second location responses based on the retrieved location information from the location source.

24. The storage medium of claim 23, wherein the first location request is for receiving location information at a first periodic interval, wherein the second location request is for receiving location information at a second periodic interval, different from said first periodic interval, and wherein coalescing the first and second location requests comprises providing the coalesced location request to the location source at a coalesced periodic interval, which is based on said first and second periodic intervals.

25. The storage medium of claim 23, wherein said instructions result in:
storing cached location information, which is based on location information retrieved from said at least one location source;
in response to at least one location request from at least one application of said first and second applications, selecting between retrieving requested location information from said location source and retrieving the requested location information from said cached location information; and
providing to said at least one application a location response including the requested location information.

26. The storage medium of claim 25, wherein said instructions result in:
dynamically updating a location caching profile based on a plurality of location requests generated by said first and second applications,
wherein said selecting comprises selecting between retrieving the requested location information from at least one of said location sources and retrieving the requested location information from said cached location information, based on said location caching profile.

* * * * *